July 15, 1947.  L. A. TROFIMOV  2,424,200

REMOTELY CONTROLLED LOAD MOVING AND POSITIONING SYSTEM

Filed June 6, 1942     3 Sheets-Sheet 1

INVENTOR.
Lev A. Trofimov
BY Harry P. Caufield
Attorney

Patented July 15, 1947

2,424,200

UNITED STATES PATENT OFFICE 2,424,200

REMOTELY CONTROLLED LOAD MOVING AND POSITIONING SYSTEM

Lev A. Trofimov, Willoughby, Ohio

Application June 6, 1942, Serial No. 446,083

6 Claims. (Cl. 172—239)

This invention relates to power control systems by which power from a power source is caused to move a load and position it in correspondence with the movement and positioning of a remotely situated controller.

The invention may be applied to various uses such as the positioning of the rudder of a ship, or the positioning of a signal, etc., etc. in which uses the load may be moved simply in forward or reverse direction; but I have chosen to illustrate and describe it herein in its more generalized aspects as applied to the movement and positioning of the type of load which has movement concurrently in a plurality of angularly related directions in response to corresponding concurrent plural-direction positioning movements of a controller; but to simplify the disclosure of the invention herein I have furthermore chosen to illustrate and describe, as illustrative of its generalized uses, its application to the movement and positioning of the gun, or guns, of a gun-turret, in either the transverse or elevational direction of movement thereof, or in both of said directions concurrently, in response to transverse and elevational movements of a remotely situated gun-sight aiming device.

It is among the objects of the invention:

To provide generally an improved system of the class referred to;

To provide an improved power control system for moving a load to a position corresponding to the position of a control device to which the latter is moved at will;

To provide an improved control system for applying great power to a massive load to position it in correspondence with the positioning of a control device which admits of being moved by relatively small power;

To provide an improved control system for moving a load in either of a plurality of angularly related directions, or in a plurality of said directions concurrently, to position the load in response to corresponding movements of a remotely situated controller;

To provide an improved power control system for moving the gun, or guns, of a gun turret to firing position, in correspondence with the movements of a remotely situated gun-sight aiming device;

To provide a power control system of the type referred to for moving the gun, or guns, of a gun turret to firing position, even if they be of great mass and inertia, in response to the movement of a gun-sight device of very light mass and inertia and which may accordingly be moved to gun aiming position by negligibly small manual power;

To provide a power control system of the class referred to in which, whether the load is moving or is at rest, the power is supplied by a continuously running motor or motors, and in which means is provided to magnify the torque of the motor upon starting the load from rest or accelerating it.

Other objects will be apparent to those skilled in the art to which my invention appertains. My invention is fully disclosed in the following description taken in connection with the accompanying drawing, in which, Fig. 1 is a view in some respects diagrammatic illustrating an embodiment of my invention;

Figure 1:
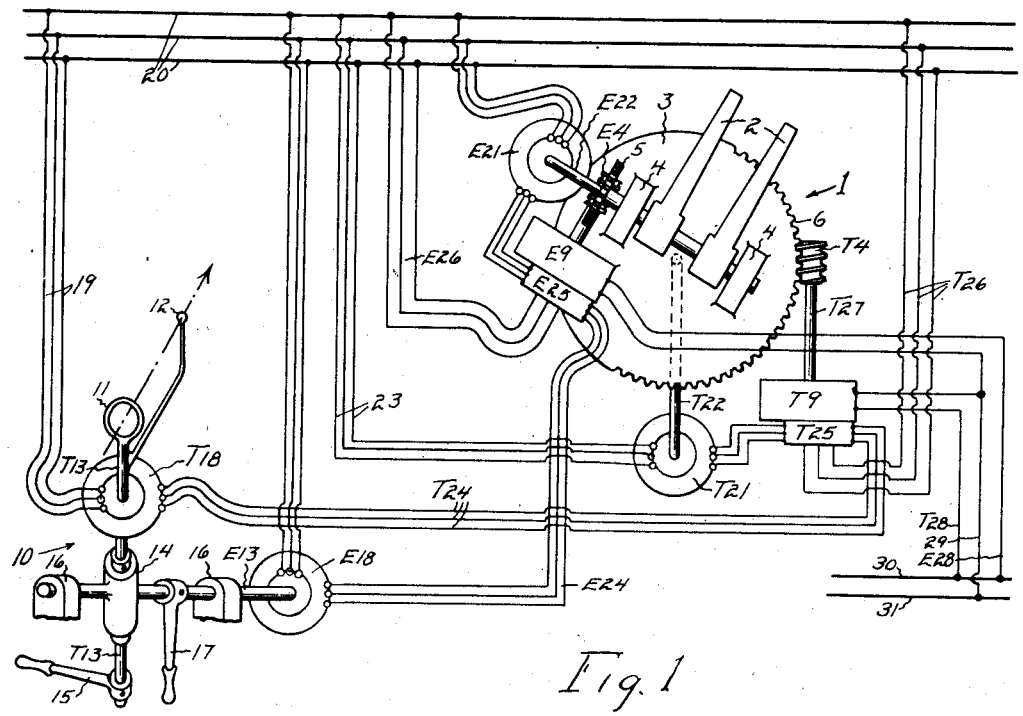

As mentioned above, in the practice of my invention the gun or guns of a gun-turret may be moved concurrently in both the transverse and elevational directions. The parts of the system to be described, by which such concurrent movement is effected in response to corresponding concurrent movements of a gun-sight or aiming device, are, to some extent, duplicated for the two said directions. It is thought therefore that the description of the invention will be more readily understood if the same reference numerals are used for similar or duplicate parts, and if the parts associated with transverse movements are distinguished by the prefix T (as designating "transverse") and those associated with elevational movements are distinguished by the prefix E (as designating "elevational") and this simplification has been introduced in the following description.

Referring to Fig. 1 of the drawing I have shown generally at 1 a gun turret, and at 2—2 the guns thereof, the guns in the diagrammatic showing of the figure being supported on a base 3, by bearings 4—4 thereon, and the guns being rotatable on the bearings about a horizintal axis to elevate them, by turning a worm E4 meshed with a worm gear 5; and being movable transversely by rotation of the base 3 around a vertical axis by means of a worm T4 meshed with a worm gear 6 on the base.

A stationary motor driven power transmission unit designated generally at T9 supplies power to the worm T4, and a similar unit E9 on the base 3, supplies power to the worm E4. These units shown here diagrammatically will be described in more detail later in connection with Fig. 2.

Shown generally in Fig. 1 at 10 and diagrammatically is a gun-sight device of a known type comprising a ring 11 and point 12, mounted upon a shaft T13 supported in a bearing 14, and movable in transverse directions upon turning of the shaft T13 by a handle 15 on the shaft. The bearing 14 is connected to a horizontal shaft E13 supported in bearings 16—16 and rotatable by a handle 17 to rock the shaft T13 around the axis of the shaft E13 to move the gun sight 10 with elevational movement. The gun sight 10 thus has universal movement in the transverse and elevational directions concurrently.

Upon movement of the gun-sights 10, to sight the same upon a target, the said worms T4 and E4 respectively are power operated to move the guns 2 in the transverse and elevational directions and bring them to rest or position them in a position corresponding to the transverse and elevational positions of the gun sight; this being accomplished in the following manner; and the gun sight device 10 is connected to the rest of the system by electric wires whereby it may be remotely situated with respect to the guns.

Connected to the shaft T13 is the rotor of a Selsyn type inductor unit T18, the rotor of this Selsyn unit being energized by three phase alternating current conducted to it by wires 19 from three phase alternating current supply mains 20. Corresponding to the Selsyn unit T18 is a Selsyn inductor unit T21, the rotor of which is connected to a shaft T22 which in turn is connected to the base 3 of the turret 1 and rotates therewith. The rotor of the Selsyn unit T21 is energized by three phase alternating current conducted thereto by wires 23 from the three phase supply 20.

The stators of the Selsyn units T18 and T21 are preferably wound three phase, and are accordingly connected to each other by three phase circuit wires T24 which wires pass through, or constitute part of the circuits of an amplifier shown generally and diagrammatically at T25 and associated with the power unit T9 to be described.

The Selsyn units T18 and T21 are of a well-known type and have a well-known mode of operation according to which three phase energization of their rotors generates three phase potentials in their stators; and when their rotors are in corresponding positions, these three phase potentials are balanced, that is, they neutralize each other and no current flows in the wires T24; but when one of the rotors is displaced with respect to the other, for example by moving the rotor of the Selsyn unit T18 by turning the shaft T13, the said generated potentials are thereby rendered unbalanced and three phase alternating current flows in the wires T24, therebetween; and this current is utilized to actuate the amplifier T25.

The amplifier T25 is of a well-known type and comprises, besides the said actuating circuit T24, an input circuit T26 connected to the three phase supply mains 20, and an output circuit going into the power unit T9. According to the well-known operation of the amplifier T25, when it is actuated by current in the wires T24, three phase aternating current flows through it from the wires T26, and when it is unactuated the current flow from the wires T26 is discontinued.

The power unit T9 comprises a power transmission connected to the shaft T27 of the worm T4, and a direct current motor driven at full speed by current supplied by wires T28 and 29 from direct current mains 30 and 31. When the amplifier is actuated and causes three phase current to be supplied to the power unit T9, this three phase current operates a power control of the power unit causing the motor to transmit power through the transmission to turn the worm shaft T27 and worm T4 to turn the turret and the guns traversely.

Transverse movement of the guns thus effected, rotates the Selsyn shaft T22, restoring its rotor to the balanced position again, at which actuating current in the wires T24 to the amplifier T25 is discontinued; and this discontinues the current from the wires T26, and this in turn effects restoring of the said power control, whereby the motor ceases to transmit power to the worm T4 and the guns come to rest in the transverse position corresponding to the transverse position of the gun sight shaft T13.

By a similar apparatus and mode of operation, upon turning the gun-sight shaft E13, Selsyn units E18 and E21, (whose rotors are connected respectively to the shaft E13, and to a shaft E22 connected to the worm wheel 5), an amplifier E25 associated with the power transmission unit E9, is actuated, and power is supplied to the motor of this power unit from the direct current mains 30 and 31 by wires E28 and 29, and the worm E4 turns the worm wheel 5 to elevate the guns the Selsyn shaft E22 restoring the Selsyn unit E21, and the guns coming to rest in the elevated position corresponding to the elevational position of the gun sight shaft E13.

Rotating the gun sight shafts T13 in the reverse direction will move the guns in the reverse transverse direction and rotation of the shaft E13 in the reverse direction will reduce their elevation as will be understood.

The power units T9 and E9 including their power controls and their association with the amplifiers T25 and E25 referred to generally above, will now be described in detail in connection with Fig. 2, the description being first directed to transverse movements.

When the amplifier T25 is actuated by unbalanced three phase current in the wires T24, three phase current from the input wires T26 supplies three phase current to output wires T32 and thence to an alternating current induction control motor T33.

The motor T33 is connected by gears T34 to one of the side gears T35 of a control differential gearing indicated generally at T36 and comprising, besides the side gear T35, a spider T37 rotatably supporting pinions T38, and another side gear T39, both side gears being meshed with the pinions. The spider T37 is connected to a shaft T40 which in turn is connected to a potentiometer type rheostat T41 to be described; and the side gear T39 is also geared by gears T42 to a shaft T43 connected by gears T44 to the worm shaft T27 upon which the aforesaid worm T4 is mounted.

The shaft T27 constitutes the load shaft or power delivery shaft of a motor driven differential transmission mechanism shown generally at T45, and the shaft T27 is caused to remain at rest or rotate in the foreward or the reverse direction by the mechanism in response to operation of the rheostat T41 which constitutes part of the control thereof and this will now be described.

Figure 2:
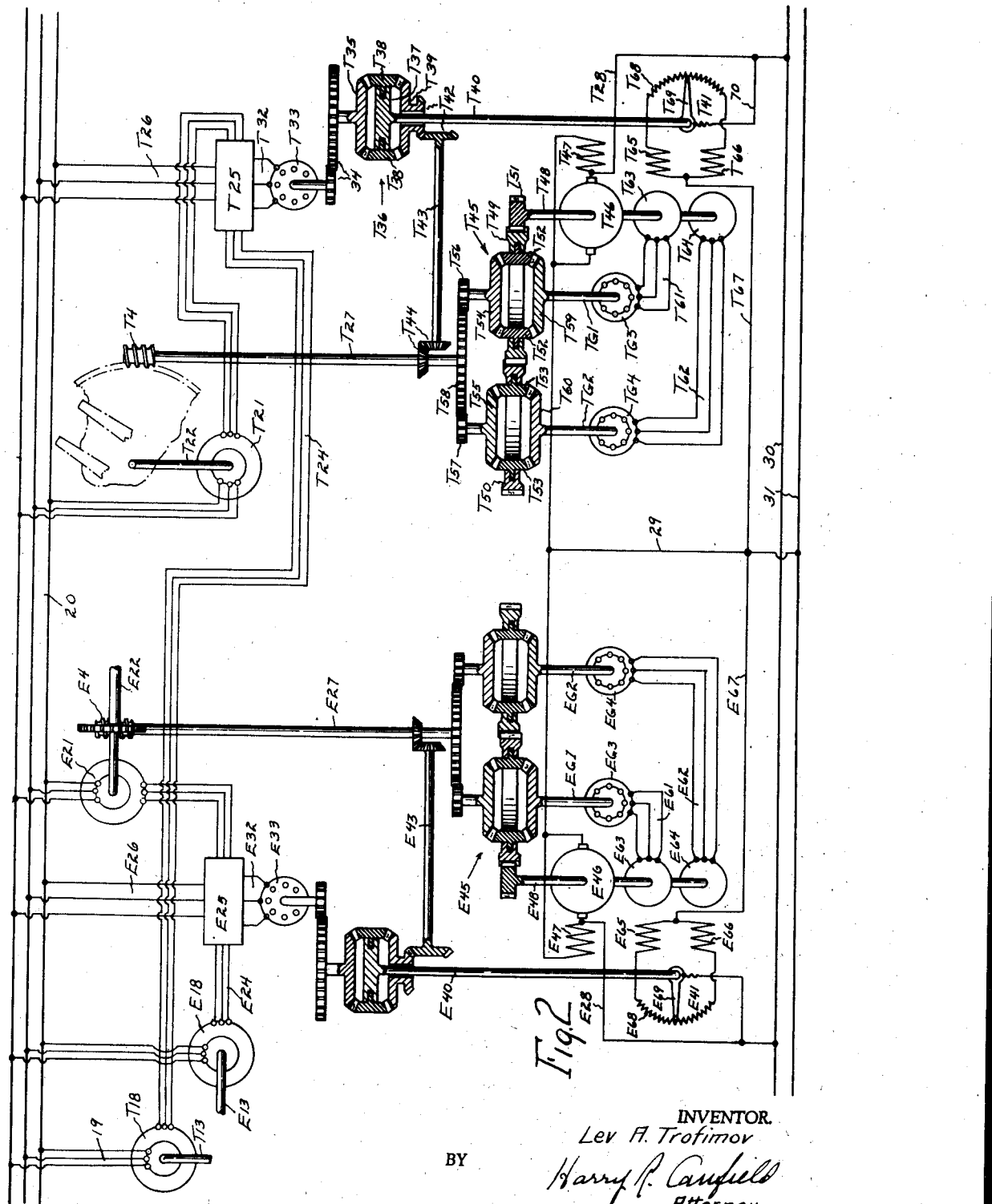
Fig. 2 is a view of the embodiment of Fig. 1 with some of the parts thereof shown to a larger scale and in greater detail.

At T46 is the electric motor above referred to which, in the embodiment of Fig. 2 is a constant speed shunt wound direct current motor, connected by the wires T28 and 29 to the direct current supply mains 30 and 31 and having a shunt field T47. The rotor shaft T48 of the motor drives two differential gearing spiders T49 and T50 in opposite directions and this may conveniently be done by providing gear teeth of equal pitch diameter on the peripheries of the spiders and meshing the teeth of one spider with those of the other and driving one of the spiders, such as the spider T49 by a pinion T51 on the shaft T48, all as shown.

The spider T49 rotatably supports pinions T52—T52; and the spider T50 rotatably supports pinions T53—T53. A side gear T54 and a side gear T55 meshed respectively with the pinions T52 and T53, are connected to gears T56 and T57 meshed with a gear T58 connected to the shaft T27. The other side gear T59 meshed with the pinions T52 is connected to a shaft TG1 and the corresponding side gear T60 meshed with the pinions T53 is connected to a shaft TG2.

It will be observed that with this double differential arrangement, if the shafts TG1 and TG2 are by any means allowed or caused to rotate at the same speed and in opposite directions, the load shaft T27 will remain at rest; and if the shaft TG1 rotates more slowly than the shaft TG2, the load shaft T27 will rotate in one direction; and if the shaft TG2 rotates more slowly than the shaft TG1, the load shaft T27 will rotate in the other direction, the speed of the load shaft T27 being determined by the relative speeds of the shafts TG1 and TG2. Also, it will be noted that for any speed of one shaft, say the shaft TG1, there is a definite corresponding speed for the other shaft TG2 and vice versa, this relation being such that the arithmetical sum of the speeds of the two shafts is a constant.

It follows that the load shaft T27 may be caused to remain at rest or rotate in either direction at any desired speed by correspondingly controlling the relative speeds of the shafts TG1 and TG2 and that while various means may be provided to thus control the speed of these shafts, in the present invention I prefer the means now to be described.

Upon the shafts TG1 and TG2 are mounted respectively the rotors of alternating current electro-dynamic units TG3 and TG4 which conveniently may be three phase squirrel-cage-rotor type alternating current induction motors, whose rotors are driven by the shafts TG1 and TG2, and which therefore operate as three phase alternating current induction generators, these units having their stators each connected to a set of three wires, T61 and T62 respectively.

Upon the shaft T48 of the motor T46 are mounted the rotors of two alternating current synchronous motors T63 and T64 which rotors have three phase windings, and the said wires T61 are connected to the rotor circuit of the synchronous motor T63, and the said three wires T62 are connected to the rotor circuit of the synchronous motor T64.

The synchronous motors T63 and T64 have direct current fields T65 and T66 respectively, one end of each of which fields is connected by a wire T67 to the aforesaid direct current supply main 31. The other ends of these fields are connected to the opposite ends of a resistor T68 over which rotatively moves a rheostat arm T69 connected to the above-mentioned shaft T40 to be rotated thereby, and the arm T69 is connected by wires 70 and T28 to the other direct current main 30.

The rheostat arm T69 is shown in a middle position on the resistor T68 so that the two fields T65 and T66 are accordingly equally energized; but as will be apparent, rotation of the shaft T40 in one direction or the other will strengthen one field and weaken the other, and vice versa. With the fields T65 and T66 equally energized, the action of the unit T45 as a whole is as follows.

In general terms, the motor T46 which normally is running at full speed, rotates the spiders T49 and T50 in opposite directions at equal speeds and the spider T49 reacts on the side gears T54 and T59 and they apply torque respectively to the load shaft T27 and the shaft TG1; and similarly the spider T30 reacting on the side gears T55 and T53 applies torque to the load shaft T27 and to the shaft TG2. The torques thus applied to the load shaft are in opposite directions. The shafts TG1 and TG2 drive the generators TG3 and TG4 and they generate equal loads of alternating current, and therefore run at the same speed. This causes the side gears T54 and T55, which exert torque in opposite directions on the load shaft T27, to remain at rest, and the load shaft T27 remains at rest. The current delivered by the generators TG3 and TG4 is supplied to the synchronous motors T63 and T64 driving them as motors, and the torque developed by them is applied to the shaft T48 and supplements the power of the motor T46.

If the rheostat arm T69 be moved in one direction or the other to unbalance the fields T65 and T66, one of the generators TG3 or TG4 will develop more electrical power than the other, and this will cause one of the shafts TG1 or TG2 to rotate slower than the other, so that one of the side gears T54 or T55 will rotate slower than the other to cause the load shaft T27 to turn in one direction or the other accordingly.

The direction and speed of the load shaft T27 therefore is determined by the relative power developed by the generators TG3 and TG4 but this power is not lost in the system, all of it being supplied back to the shaft 48 of the motor T46.

More specifically speaking, the electrical interconnection and the power transference between the generators TG3—TG4 and the motors T63 and T64, which is unique so far as I am aware, may be analyzed as follows in connection with one generator and one motor. The shaft T48 causes the rotor of the motor T63 to be driven at constant speed, and it may therefore be considered as producing three phase potential in the wires T61, and as determining or establishing therein a frequency corresponding to the speed and number of poles of the motor T63; and this frequency and potential is impressed upon the stator of the generator TG3 and produces a rotary magnetic field therein. The generator TG3 has preferably the same construction as a squirrel cage induction motor. If in general, three phase alternating potential be impressed upon the stator of a squirrel cage induction motor producing a rotary field therein, and if its rotor be driven above the speed of the rotary field, determined for it by the frequency of the impressed supply, it will generate three phase current and deliver it back to the supply, at the frequency of the supply. If therefore the rotor of the generator TG3 be driven at a speed above the speed of its rotary field, that is, its synchronous speed, established for it by the motor T63, it will supply three phase power to the motor T63 through the wires T61. By providing a suitable number of poles for the motor T63, and a suitable winding for the stator of the generator TG3, the synchronous speed for the generator TG3 or the speed of its rotary field, established in the wires T61 will always be less than the speed of the generator TG3 so that it will always be driven above this speed and will supply three phase power through the wires T61 to the motor T63, at the frequency of the circuit T61, determined by the motor T63.

Considering now the over-all functions of the transverse movement part of the system described above, it will be assumed that, at the gun sight device, the shaft T13 is stationary and the Selsyn units T18 and T21 have their rotors stationary, and in mutually neutralizing positions. Assuming now that the handle shaft T13 be turned to move the gun sight transversely (as described for Fig. 1), the rotor of the Selsyn unit T18 will thereby be moved relatively to the rotor of the Selsyn unit T21 and three phase alternating current will flow in the wires T24. This will cause the amplifier T25 supplied by wires T26 to transmit three phase alternating current by its output wires T32 to the motor T33 rotating it and the gears T34 and side gear T35 of the control differential T36. The side gear T39 of the control differential T36 is at rest, being connected to the stationary load shaft T27 so that rotation of the side gear T35 will rotate the spider T37 and the shaft T40 and move the rheostat arm T69 away from its middle position. This energizes the fields T65—T66 unequally. This as described causes one of the generators TG3 or TG4 to develop more load than the other and causes the corresponding shaft TG1 or TG2 to rotate slower than the other, thereby causing the shaft T27 to rotate.

Rotation of the shaft T27 rotates the worm T4 and moves the guns 2 in a corresponding transverse direction.

Rotation of the shaft T27, transmitted through the gears T44 and shaft T43 and gears T42 to the side gear T39 of the control differential T36, rotates the side gear T39 in the direction opposite to the rotation of the side gear T35 so that the spider T37 and the rheostat shaft T40 connected to it slow down, and this slows down the movement of the rheostat arm T69 leaving the fields T65—T66 still unbalanced. Transverse movement of the guns and base 3, acting through the shaft T22 (as described for Fig. 1), moves the rotor of the Selsyn unit T21 in the direction to reduce the current in the wires T24 and toward the position at which it again will ultimately oppose the rotor of the Selsyn unit T18 and stop current flow in the wires T24, and the motor T33 is thereby slowed down. As the motor T33 slows down, slowing down rotation of the side gear T35 of the control differential T36, the speed of the side gear T39 exceeds that of the side gear 35 and the rheostate shaft T40 rotates in the other direction and moves the rheostat arm T69 back toward its middle position, thus slowing down the shaft T27. By the time the rheostat arm has thus been returned to its middle position, which as will be understood causes the shaft T27 to stop rotating, the Selsyn unit T21 has reached its neutralizing position completely stopping the motor T33. The guns 2 have thus taken up a transverse position corresponding to the transverse position of the gun-sight shaft T13.

The same action occurs as will be obvious whether the transverse movement of the gun-sight shaft T13 be toward the right or toward the left, causing the guns 2 to take up a corresponding transverse position toward the right or toward the left, it being understood that if the rotor of the Selsyn unit T18 be turned in one direction, the phase relationship of the three phase current in the wires T24 will effect a current supply to the motor T33 by wires T32 to turn the motor T33 in one direction, and if the rotor of the Selsyn unit T18 be rotated in the reverse direction the three phase alternating current in the wires T32 will have the reverse phase relation to cause the motor to rotate in the reverse direction, whereby the rheostat arm T69 will be moved to one side or the other of the middle position to cause the load shaft T27 to rotate in one direction or the other.

The above-described operation of the system for transverse movement will apply to its operation for elevational movement of the guns 2 through the agency of the power shaft E27 and the worm E4 upon turning of the gun-sight shaft E13, by reading the foregoing description with the prefix E substituted for the prefix T.

It is believed furthermore that it will now be clear from the foregoing description that positioning of the gun-sight device by universal or concurrent movements will effect corresponding universal or concurrent movements of the guns in transverse and elevational directions to a firing position corresponding to the aiming position of the gun-sight device.

Figure 3:
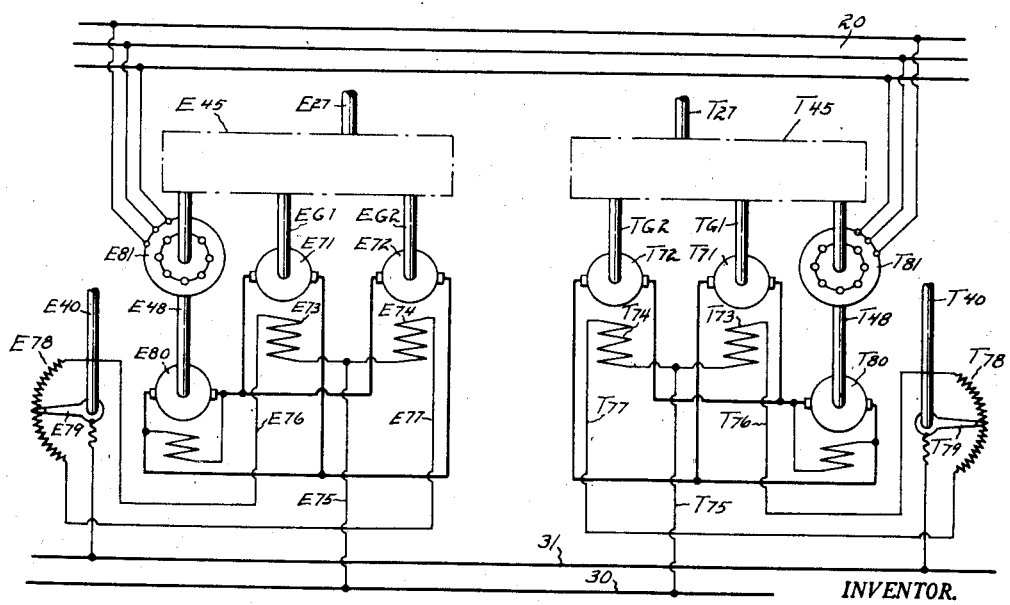
Fig. 3 is a fragmentary view similar to a part of Fig. 2, illustrating a modification.

In the modification of Fig. 3, the local electrical system for the electric power supply units is a direct current system instead of an alternating current system as in Fig. 2. The shafts TG1 and TG2 drive direct current generators T71 and T72, the fields T73 and T74 of which are supplied by current from the direct current supply main 30 by wire T75 to one end of each field, the other ends thereof being connected by wires T76 and T77 to the ends of a rheostat resistor T78, the arm T79 of which is again connected to the shaft T40.

The armatures of the generators T71 and T72 are connected in parallel to the armature of a direct current motor T80 on the shaft T46 of a main power motor T81, the latter as a further modification being shown as a three phase induction motor connected to the supply mains 20. When the rheostat arm T79 is in its mid-position, the loads of the generators T71 and T72 will be equal, and the shafts TG1 and TG2 will be caused thereby to rotate at the same speed; and when the rheostat arm T79 is moved in one direction or the other, thereby varying the load power developed relatively by the generators, the shafts TG1 and TG2 will be thereby caused to rotate at different speeds for the purposes described in connection with the form of Fig. 2. The current loads of the generators T71 and T72 are supplied to the motor T80 and drive it, and its power supplements the power of the motor T81.

It is believed that with this brief description of Fig. 3 its operation will be understood in view of the more complete description of the form of Fig. 2.

In either the form of Fig. 2, or that of Fig. 3, the supplying of the generator load power to the shaft of the main motor (T46 or T81) has the effect of enabling the main motor to supply power to the load shaft T27 not only at the full speed of the main motor but at its full torque, so that the full power of the main motor is applied to accelerate the load with the advantage that turret operating load, even if it be a load of great inertia, may be quickly brought up to speed.

Differential gearing of the bevel gear type has for convenience been illustrated and described but it will be apparent that differential gearing of the planetary type may be utilized instead.

Figure 4:
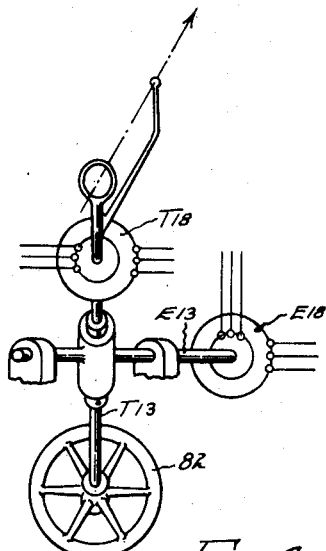
Fig. 4 is a view of a part of Fig. 1 illustrating a modification.

In the modification shown in Fig. 4, the Selsyn units T18 and E18 may be rotated concurrently for the purposes described by a single handle. The shaft T13 carries a wheel 82 which upon being rotated rotates the shaft T13 on its axis to rotate the Selsyn unit T18; and upon raising or lowering the wheel 82 bodily the shaft T13 reacts through the bearing 14 to rotate the shaft E13 on its axis to rotate the Selsyn unit E18.

The relative pitch diameters of the several mutually engaged pairs of gears above described, may be those shown in the drawing, but these may be varied as will be understood by those skilled in the art.

Obviously the induction motor T81 of Fig. 3 can be used instead of the direct current motor T46 of Fig. 2; and vice versa.

The movements of the guns have been described in the foregoing as transverse (to direct their line of fire toward the right or left as viewed in the drawing) and as elevational (to raise or lower their line of fire); and this applies to the particular application of my invention to gun turret control. As stated hereinbefore my invention may be applied to the movement and positioning of other types of load; and therefore, as a more generalized description of the movements of the load the movements may be considered as forward and reverse movements in one direction and forward and reverse movements in another direction; and movement in anyone of the said four directions may be effected alone; or either of the movements in one direction may be effected concurrently with either of the movements in the other direction.

In the form of Fig. 2, there are, as has been described, two fields, energized by electromagnetic windings T65 and T66; and in the form of Fig. 3 there are similarly two fields, energized by windings T73 and T74. It is the unbalanced generator load conditions produced by these windings, in either case which bring about movement of the guns; and it is the balanced conditions thereof which bring the guns to rest. If the generators are identical, as preferred, the two fields may be alike in which case equal currents in the windings will bring the guns to rest and unequal currents will move them.

Other means to attain the balancing and unbalancing of the generator loads than that shown may be employed; and my invention is comprehensive of such other means; as well as being comprehensive of all changes and modifications of the embodiments shown and described which may occur to those skilled in the art and which come within the scope of the appended claims.

I claim:

1. In a power control system for moving a load and bringing it to rest to position it; a power unit; a pair of electrically energizable electromagnetic means associated with the power unit and effective to cause the power unit to supply power to the load to move it or bring it to rest in accordance with unequal or equal energization of said means respectively; a rheostat controlling relative energization of said means; a movable rheostat element having a normal position at which said means are equally energized; an electric motor for moving the rheostat element from said normal position to effect unequal energization of said means; means to transmit load movement to the rheostat element to return it to normal position; electric circuit means to supply electrical power to the electric motor; a pair of devices associated with the electric circuit means and controlling said supply of electric power to the motor thereby and the pair of devices being movable relative to each other and having corresponding balanced positions relative to each other at which no electric power is supplied to the motor and other and unbalanced positions relative to each other at which electric power is supplied to the motor; primary operating means to move one of said devices relative to the other to dispose the devices in unbalanced relative positions; and the other of said devices being movable relative to the said one of the devices responsive to load movement to dispose them in balanced relative positions.

2. In a power control system for moving a load and bringing it to rest to position it; a power unit; a pair of electrically energizable electromagnetic means associated with the power unit and effective to cause the power unit to supply power to the load to move it in one direction or the other or bring it to rest in accordance with corresponding unequal or equal energization of said means respectively; a rheostat controlling relative energization of said means; a movable rheostat element having a normal position at which said means are equally energized; a reversible electric motor for moving the rheostat element in alternate directions from said normal position to effect corresponding unequal energization of said means; means to transmit load movement to the rheostat element to return it to normal position; electric circuit means to supply electrical power to the electric motor; a pair of devices associated with the electric circuit means and controlling said supply of electric power to the motor thereby; and the pair of devices being movable relative to each other and having corresponding balanced positions relative to each other at which no electric power is supplied to the motor and other and unbalanced positions relative to each other at which electric power is supplied to the motor to drive it in one direction or the other; primary operating means to move one of said devices relative to the other to dispose the devices in unbalanced relative positions; and the other of said devices being movable relative to the said one of the devices responsive to load movement to dispose them in balanced relative positions.

3. In a power control system for moving a load and bringing it to rest to position it; a power unit comprising a rotary power output element for connection to a load, a continuously running power supplying main motor, and a power transmission between the motor and the output element; a controller comprising a movable controller element controlling the transmission and causing the output element to be rotated by main motor transmitted power or to be at rest in response, respectively, to movement of the controller element from a normal position or to the normal position; an auxiliary motor; means for transmitting rotary movement of the auxiliary motor to the controller element; means, for transmitting transmitted power to the controller element in the direction to return it to normal position; electric circuit means for supplying current to the auxiliary motor; a pair of control devices associated with the circuit means and controlling current therein; and the devices each being movable relative to each other; and having unbalanced positions relative to each other at which current in the circuit means is caused to drive the auxiliary motor, and having other and balanced positions relative to each other at which the auxiliary motor is causd to be at rest; actuating means by which one of the devices may be moved relative to the other to dispose them in unbalanced relative positions; and means to move the other one of the devices by transmission-transmitted power to dispose the devices in balanced relative positions.

4. In a power control system for moving a load and bringing it to rest to position it; a power unit comprising a rotary power output element for connection to a load, a continuously running power supplying main motor, and a power transmission between the motor and the output element; a controller comprising a movable controller element controlling the transmission and causing the output element to be rotated by main motor transmitted power or to be at rest in response, respectively, to movement of the controller element from a normal position or to the normal position; an auxiliary motor; means comprising differential gearing for transmitting rotary movement of the auxiliary motor to the controller element; means, including said differential gearing for transmitting transmitted power to the controller element in the direction to return it to normal position; electric circuit means for supplying current to the auxiliary motor; a pair of control devices associated with the circuit means and controlling current therein; and the devices each being movable relative to each other; and having unbalanced positions relative to each other at which current in the circuit means is caused to drive the auxiliary motor, and having other and balanced positions relative to each other at which the auxiliary motor is caused to be at rest; actuating means by which one of the devices may be moved relative to the other to dispose them in unbalanced relative positions; and means to move the other one of the devices by transmission-transmitted power to dispose the devices in balanced relative positions.

5. In a power control system for moving a load in either a forward or a reverse direction and bringing it to rest to position it; a power unit comprising a rotary power output element for connection to a load, a continuously running power supplying main motor, and a power transmission between the motor and the output element; a controller comprising a movable controller element controlling the transmission and causing the output element to be rotated in one direction or the other by main motor transmitted power or to be at rest in response respectively to movement of the controller element to one side or the other of an intermediate position or to the intermediate position; a reversible auxiliary motor; means transmitting rotary movement of the auxiliary motor to the controller element; means for transmitting transmitted power to the controller element in the direction to return it to its intermediate position; electric circuit means for supplying current to the auxiliary motor; a pair of control devices associated with the circuit means and controlling current therein; and the devices each being movable relative to the other; and having unbalanced positions relative to each other at which current in the circuit means is caused to drive the auxiliary motor in one direction or the other and having other and balanced positions relative to each other at which the auxiliary motor is caused to be at rest; actuating means by which one of the devices may be moved relative to the other to dispose them in unbalanced relative positions; and means to move the other one of the devices by transmission-transmitted power to dispose the devices in balanced relative positions.

6. In a power control system for moving a load in either a forward or a reverse direction and bringing it to rest to position it; a power unit comprising a rotary power output element for connection to a load, a continuously running power supplying main motor, and a power transmission between the motor and the output element; a controller comprising a movable controller element controlling the transmission and causing the output element to be rotated in one direction or the other by main motor transmitted power or to be at rest in response respectively, to movement of the controller element to one side or the other of an intermediate position or to the intermediate position; a reversible auxiliary motor; means comprising auxiliary differential gearing transmitting rotary movement of the auxiliary motor to the controller element; means including said auxiliary differential gearing for transmitting transmitted power to the controller element in the direction to return it to its intermediate position; electric circuit means for supplying current to the auxiliary motor; a pair of control devices associated with the circuit means and controlling current therein; and the devices each being movable relative to each other; and having unbalanced positions relative to each other at which current in the circuit means is caused to drive the auxiliary motor in one direction or the other and having other and balanced positions relative to each other at which the auxiliary motor is caused to be at rest; actuating means by which one of the devices may be moved relative to the other to dispose them in unbalanced relative positions; and means to move the other one of the devices by transmission-transmitted power to dispose the devices in balanced relative positions.

LEV A. TROFIMOV.

REFERENCES CITED

The following references are of record in the file of this patent:

UNITED STATES PATENTS

| Number | Name | Date |
|---|---|---|
| 2,130,899 | Peters | Sept. 20, 1938 |
| 942,198 | Dey | Dec. 7, 1909 |
| 1,122,942 | Kaminski | Dec. 29, 1914 |
| 1,077,725 | Kramer | Nov. 4, 1913 |
| 1,547,392 | Hewlett et al. | July 28, 1925 |
| 1,937,336 | Ford et al. | Nov. 28, 1933 |
| 1,881,011 | Wittkuhns | Oct. 4, 1932 |